April 19, 1927.

E. L. GRUNENWALD 1,625,314

ELECTRICAL SYNCHRONIZING SYSTEM

Filed Oct. 20, 1922    2 Sheets-Sheet 1

INVENTOR

Etienne Léon Grunenwald

By

ATTORNEY

April 19, 1927.
E. L. GRUNENWALD
1,625,314
ELECTRICAL SYNCHRONIZING SYSTEM
Filed Oct. 20, 1922    2 Sheets-Sheet 2
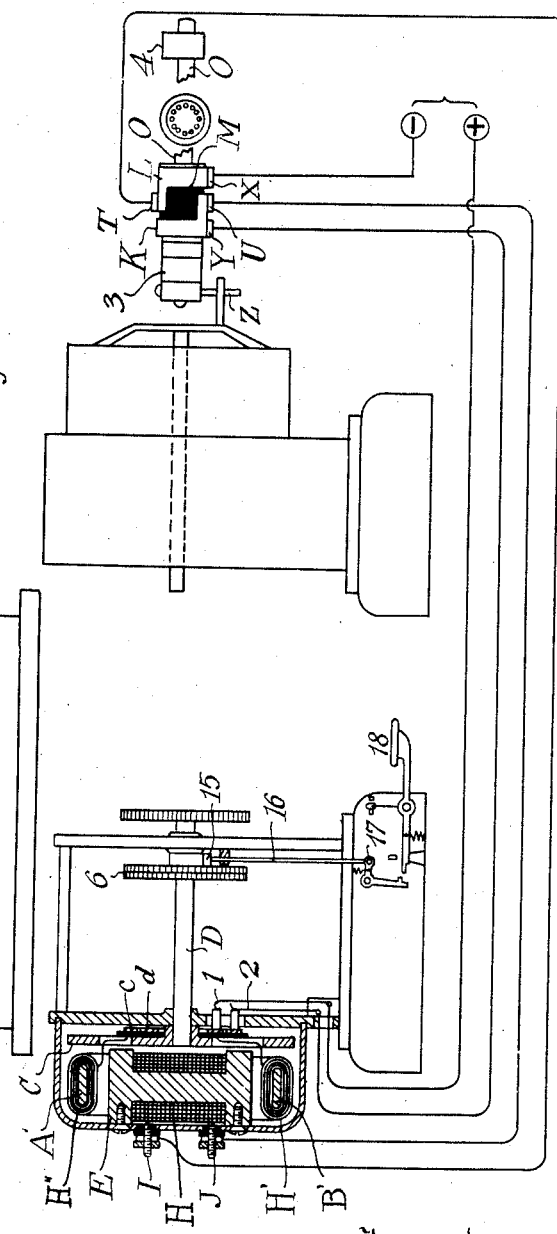
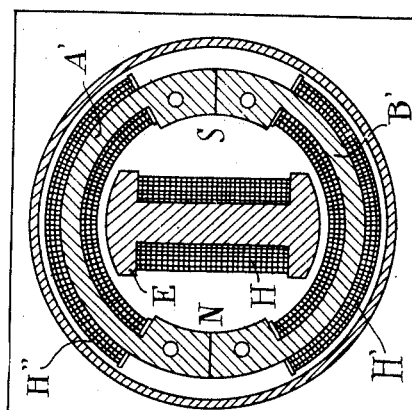
Inventor
Etienne Leon Grunenwald
By Emil Bönnelyche
Attorney Patented Apr. 19, 1927.

1,625,314

UNITED STATES PATENT OFFICE.

ETIENNE-LÉON GRUNENWALD, OF PARIS, FRANCE.

ELECTRICAL SYNCHRONIZING SYSTEM.

Application filed October 20, 1922, Serial No. 595,852, and in France November 3, 1921.

The object of this invention is to provide an electro-magnetic controlling device designed exclusively to actuate telegraphic apparatus with a continuous and synchronous rotary motion.

In the following description, it will be assumed, as an example, that the invention is applied to establish synchronism between the distributor and the translating devices used for telegraphic receiving with ordinary Baudot apparatus.

In order to make the invention more clearly understood, it has been illustrated in the accompanying drawings as applied to the above mentioned telegraphic apparatus, in which drawings:

Fig. 5 is a view similar to Fig. 1, but in which the permanent magnets are replaced by electro-magnets.

Fig. 6 is a part-sectional side elevation of the assembled apparatus.

In principle, the invention consists of an electro-magnetic motor with bi-polar rotor and stator; the rotor is coupled directly with the shaft of the apparatus to be actuated. The two magnetic poles of the rotor have a fixed position; whereas the position of the two magnetic poles of the stator is reversed at each half-revolution, due to receiving current impulses the electric polarity of which is reversed at each half-revolution of the rotor. These reversed currents are produced by periodic reversal of the two poles of a source of direct current by means of a bi-polar reverser driven by an apparatus of any sort, either rotary or stationary, with which it is desired to put into rotating and synchronous motion the apparatus on which is mounted the said bi-polar motor whose rotor and stator are fed by a single current source. The concordance of the electric phases emitted by the bi-polar reverser with the magnetic phases of the said bi-polar motor result in producing isochronism and synchronism between the two apparatus; that is to say, if the two apparatus are rotary, the two moving bodies will occupy at the same moment the same point in space.

In the case where simple electro-magnets constitute the rotor and the stator, the word "electro-motor" will be employed hereinafter to denote this motor set which is also self-regulating: 1st. due to its being unaffected by the electric variations of the feeding source owing to the equilibrium resulting from the magnetic action and reaction of the rotor on the stator; 2nd. due to its instantaneous adaptation to all the speed rates required from it by the apparatus under the control of which it is placed.

Figure 1:
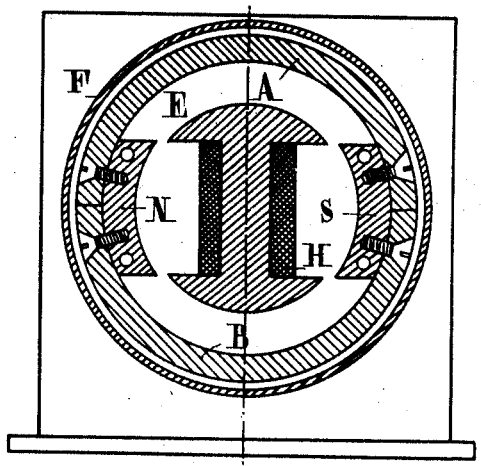
Figure 1 is a section on line 1—1 of Fig. 2.
Figure 2:
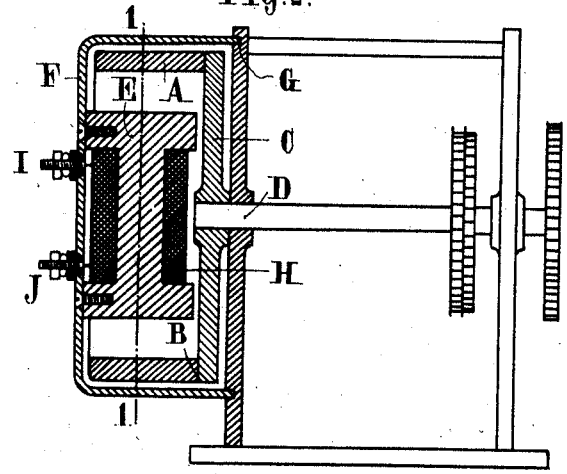
Fig. 2 is a cross section showing the device mounted directly on the shaft of the translator at the receiving station.

As shown in Figs. 1 and 2, and in the case of the apparatus being applied to effect synchronism between a distributor and a translator, the said apparatus comprises:

1. Two semi-circular magnets A and B secured on the two pole-pieces N and S which are centered and mounted on a nonmagnetic plate C fast on the shaft D of the translator, this set constituting the bi-polar rotor which itself forms a flywheel to regulate the working of the apparatus.

2. A soft iron core E, the polar ends of which terminate in segmental shoes which are fastened to the non-magnetic cover F fixed on the back plate of the translator, the edge of the cover being engaged in a circular groove G in said plate; the perfect centering of this mounting permits the rotor to rotate freely around the core with a minimum of air gap, and the said core is fitted with a winding H of insulated copper wire, the two ends of which are connected with the contact studs I and J electrically insulated in respect to one another; this set constituting the bi-polar stator.

Figure 4:
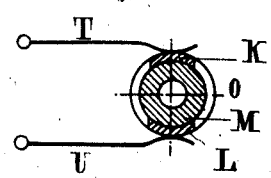
Fig. 4 is a section on line 4—4 of Fig. 3;
Figure 3:
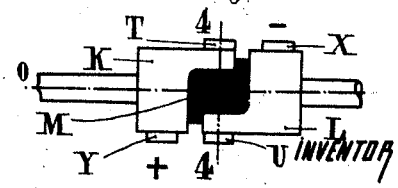
Fig. 3 is a plan view of the automatic current-reversing rotary commutator mounted on the distributor shaft.

3. Two substantially T-shaped metal members K and L, Figs. 3 and 4, are mounted in opposing relation on a sleeve M made of insulating material and secured on shaft O of the distributor. The metal brushes T and U, engaging the stem portions of these members are in electrical connection with terminals I and J; and two other metal brushes X and Y contacting with the cylindrical or body parts of said members are connected with the two poles of a direct-current source. This set, which is mounted on the shaft of the distributor, or on an auxiliary shaft rotated at the same angular speed, constitutes an automatic commutator which at each half-revolution of the distributor will send into coil H reversed currents that will reverse the magnetic polarity of core E.

The working of the apparatus is as follows:

The distributor being in operation, the shaft of the translating device merely has to be rotated by hand a few turns, and immediately, from concordance between the electric phases emitted by the commutator and from the magnetic effects of the stator on the rotor, there will result a torque which will actuate the translator with a continuous rotary motion synchronous with that of the distributor, on the shaft of which latter the reversing commutator K L is mounted. Proper setting of the commutator on its driving shaft determines the exact point at which the translator works in its respective sector. All the reversing commutators of a plant which includes a plurality of translators should be grouped on one and the same shaft.

It will be readily understood that, without departing at all from the principle of the invention, the arrangement above described can be modified in various ways.

As above stated, the rotor of the bi-polar motor is constituted by two permanent magnets A and B. But as shown in Fig. 5, said permanent magnets A and B may be replaced by two semi-circular electro-magnets A' and B' terminating in pole-pieces N and S secured on the non-magnetic plate C. The windings H' and H'' of these electro-magnets are interconnected in series and the current required to energize them is supplied by brushes 1 and 2 (Fig 6), contacting with rings c and d suitably insulated from one another; on said rings the inlet and outlet terminals of windings H' and H'' are connected. Energization of said electro-magnets A' and B' may be effected either separately or in series with the stator core, and they may also receive alternating currents, while direct current flows through the stator.

Due to omission of the magnets, the word "electro-motor" will be used in the course of this description to denote this motor system which, being at the same time an electro-motor, a self-regulator and a synchronizer, is applicable to telegraphic apparatus.

The electromotor can be made to work with direct current sources of any voltage. The same direct current reversing group can actuate several electromotors electrically mounted in series or in shunt; the required positioning as regards the sectors of the Baudot distributor being made, in this case, either on the rotor or on the stator and for diametrically opposite sectors mere inversion of the wires will be sufficient.

The reversing commutator members or rings K and L (Fig. 3) may be mounted on the shaft of the distributor as therein shown, or may be mounted, as in Fig. 6, on a shaft O journaled in bearings 3 and 4. An assembling support allows this group of reversing commutators to be positioned in axial line with the shaft whereon the brush-carrying arm of the distributor is mounted; and a tappet Z on shaft O is designed to engage a finger secured on the brush-carrier arm, thus ensuring mechanical connection between these two members while leaving them quite free for dismantling or adjustment.

The ends of each commutator have twelve holes, and a pin driven into one of these holes permits suitable angular locking of the commutators in respect to one another as well as their adjustment in respect to the brushes of the distributor.

The application of the invention to the Baudot translator offers the further characteristic feature of leaving entirely free the whole surface of the supporting base or stand. This surface can, therefore, be used advantageously to mount the five levers of the Baudot transmitter, so that there can be obtained, due to this fact, a complete and compact apparatus which, owing to the small space it occupies, can be positioned anywhere and according to operating requirements. The proximity of the keyboard thus mounted to the coupling or connector shaft permits of obtaining, by means of the simple and powerful mechanical movement of cam 15 (Fig. 6), which is settable as desired, of connecting rod 16 and of hook 17, the mechanical locking of the five levers or keys 18 in both operative and off positions; therefore, the keys can neither be lowered nor unlocked during the sending period and can only be operated during the passage of the nose of the cam over the connecting rod 16. This system gives, by touch, a very clear indication of the timing to be observed, which timing, indeed, can be indicated by any audible or sonorous appliance mechanically actuated by the translator shaft itself.

The hand-operated transmitter constitutes a removable unit which slides drawerlike in the base, establishing its electrical connection by means of contact springs.

In the case of automatic transmission by means of a previously-perforated strip of paper, all the mechanical motions required for this kind of apparatus (paper feed and contact operation) are obtained from the shaft itself. The alphabetical keyboard can also be mounted on this base, since the latter is of adequate size.

I claim as my invention:—

An electrical synchronizing system comprising a controller, and a driven apparatus caused to rotate in synchronism therewith; said controller comprising commutator rings and a movable element, said commutator rings being angularly adjustable relatively to one another and at will angularly adjustable as a unit relatively to said movable element; a source of direct current, fixed brushes bearing upon the commutator rings and electrically connected to the source of direct current and to the driven apparatus; said driven apparatus comprising a bi-polar stator mounted in fixed position and receiving the alternating currents emitted by the commutator rings, a driven shaft, and a bi-polar rotor on said shaft surrounding the stator and developing a magnetic field of N. S. direction; such field acting conjointly with the alternating field created in the stator to determine the synchronous movement of said driven shaft and its desired angular adjustment relative to the movable element of the controller.

In testimony whereof I affix my signature.

ETIENNE LÉON GRUNENWALD.